(12) United States Patent
Van Den Berg et al.

(10) Patent No.: US 8,612,083 B2
(45) Date of Patent: Dec. 17, 2013

(54) VEHICLE FOR DISPLACING FEED

(71) Applicant: Lely Patent N.V., Maassluis (NL)

(72) Inventors: Karel Van Den Berg, Bleskensgraaf (NL); Werner Hendrikus Johannes Adrianus De Rooij, Terheijden (NL); Jan Martinus Van Kuilenburg, Wadenoyen (NL); Nicolaas Johannes Wilhelmus Van Paassen, Maassluis (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/672,721

(22) Filed: Nov. 9, 2012

(65) Prior Publication Data

US 2013/0073137 A1    Mar. 21, 2013

Related U.S. Application Data

(63) Continuation of application No. PCT/NL2011/000038, filed on May 6, 2011.

(30) Foreign Application Priority Data

May 12, 2010 (NL) .................................. 1037957

(51) Int. Cl.
*G05D 1/02* (2006.01)

(52) U.S. Cl.
USPC .................................. 701/23; 701/50; 15/319

(58) Field of Classification Search
USPC ........ 701/23, 50, 300, 301; 119/14.11, 14.14, 119/51.02, 72; 700/245, 253, 255, 258; 15/318, 319

See application file for complete search history.

(56) References Cited

U.S. PATENT DOCUMENTS

| | | | |
|---|---|---|---|
| 2,966,256 A | 12/1960 | McLeland | |
| 3,273,038 A | 9/1966 | Miller | |
| 4,119,900 A | 10/1978 | Kremnitz | |
| 5,109,566 A | 5/1992 | Kobayashi | |
| 5,309,592 A | 5/1994 | Hiratsuka | |
| 5,341,540 A | 8/1994 | Soupert et al. | |
| 5,646,494 A | 7/1997 | Han | |
| 8,316,799 B2 * | 11/2012 | Van Den Berg | ........... 119/51.02 |
| 8,397,670 B2 * | 3/2013 | Van Den Berg | ........... 119/14.11 |

(Continued)

FOREIGN PATENT DOCUMENTS

| | | |
|---|---|---|
| DE | 1109441 B | 6/1961 |
| DE | 1183301 B | 12/1964 |

(Continued)

OTHER PUBLICATIONS

International Search Report issued on Aug. 18, 2011.

*Primary Examiner* — Richard Camby

(74) *Attorney, Agent, or Firm* — Hoyng Monegier LLP; Coraline J. Haitjema; David P. Owen

(57) ABSTRACT

The invention provides an autonomous vehicle for displacing feed laterally, comprising a frame having two separately drivable rear wheels and a front supporting point, and a feed displacer in the form of an annular element which is freely rotatable and has a radius r, said element forming the outer circumference of the vehicle. In order to enhance the control stability, the rear wheels are situated at a distance of less than a radius from the geometric center of the vehicle.

20 Claims, 2 Drawing Sheets

(56) References Cited

U.S. PATENT DOCUMENTS

| | | | |
|---|---|---|---|
| 8,456,125 B2 * | 6/2013 | Landry et al. | 318/587 |
| 8,463,438 B2 * | 6/2013 | Jones et al. | 700/253 |
| 8,474,090 B2 * | 7/2013 | Jones et al. | 15/319 |
| 2009/0069968 A1 | 3/2009 | Van Den Berg | |

FOREIGN PATENT DOCUMENTS

| | | | |
|---|---|---|---|
| DE | 4425924 A1 | 1/1996 | |
| DE | 4444508 C1 | 2/1996 | |
| EP | 0142594 B1 | 6/1989 | |
| EP | 0382693 B1 | 10/1994 | |
| EP | 1368017 A2 | 8/2002 | |
| EP | 0943235 B1 | 11/2003 | |
| EP | 1779722 A1 | 5/2007 | |
| EP | 1369012 B1 | 4/2008 | |
| EP | 1369010 B1 | 3/2009 | |
| FR | 2862489 A1 | 5/2005 | |
| GB | 2313190 A | 11/1997 | |
| GB | 2313191 A | 11/1997 | |
| NL | 7416427 A | 6/1975 | |
| NL | 1031605 C2 | 10/2007 | |
| WO | 96/03259 A | 2/1996 | |

* cited by examiner

VEHICLE FOR DISPLACING FEED

CROSS REFERENCE TO RELATED APPLICATIONS

This application is a continuation of PCT application number PCT/NL2011/000038 filed on 6 May 2011, which claims priority from Netherlands application number NL 1037957 filed on 12 May 2010. Both applications are hereby incorporated by reference in their entireties.

BACKGROUND OF THE INVENTION

1. Field of the Invention

The invention relates generally to an unmanned autonomous vehicle. The invention relates in particular to an unmanned autonomous vehicle for displacing feed lying on a floor substantially laterally, comprising a frame having at least three supporting points, comprising a front supporting point and two wheels separately drivable by separate motors and each having a wheel axle, a control unit for steering the vehicle and moving it in a direction of operative travel, and feed displacing means (e.g., feed displacer) for displacing feed substantially laterally, comprising an annular element which is freely rotatable around the frame and has a radius, the outer circumference of said element constituting the outer circumference of the vehicle, wherein a centre of gravity of the vehicle, viewed in the direction of operative travel, is situated between the front supporting point and the wheels.

2. Description of the Related Art

In the state of the art, such a vehicle is known from NL-1031605. This vehicle is sold, for example, under the name of Lely Juno©, Lely Enterprises, Maassluis, the Netherlands. This vehicle moves along a feed alley, and pushes feed lying on the floor aside, in the direction of the animals, during travelling.

A disadvantage of the known vehicle is that the vehicle, during pushing the feed, cannot always be controlled properly. It sometimes happens that the vehicle gets stuck in the feed, for example if a more than average amount of feed, which amount is still relatively small, makes contact with the feed displacing means.

BRIEF SUMMARY OF THE INVENTION

It is an object of the invention to provide an unmanned autonomous vehicle for displacing feed lying on a floor substantially laterally with respect to a direction of operative travel, which has an improved control, in particular a more stable control, under such circumstances.

For this purpose, the invention provides an unmanned autonomous vehicle for displacing feed lying on a floor substantially laterally with respect to a direction of operative travel, which is characterized in that, viewed perpendicularly to the direction of operative travel and in side view, a distance between each of the wheel axles and a perpendicular line through a geometric centre of the feed displacing means amounts to less than one third of said radius. It has been found in practice that the stability of the vehicle control clearly increases with respect to the known device which has a corresponding ratio of almost 1:2.

Without deeming herself to be bound by an explanation, the applicant supposes that the effect of the invention is caused by the fact that in case of the selected positioning of the rear wheels with respect to the geometric centre or at least a vertical perpendicular line through said centre, and the resulting moment, the pushing force of the feed to be displaced, acting at the lateral side and obliquely, can be compensated more quickly and more efficiently by the opposite rear wheel and the control thereof. Where, in the case of unobstructed travelling, a longer wheel base provides in principle a more stable control, in this case, the "centering" of the rear wheels appears to be more important. It is pointed out that the circumstance that, when the present type of vehicle is used, an alternating force acts obliquely on the front of the vehicle, causes the control constantly to make adjustments via the driven wheels. Due to the fact that the force/forces does/do not act straight on the front and/or on a straight surface, the predictability of the control stability is much smaller.

In the present invention, by direction of operative travel is meant the direction assumed when the device, during use, moves straight on and pushes feed. Consequently, in this case, the rear (driven) wheels will propel the vehicle. Of course, it is possible to make the vehicle move rearwardly by reversing the direction of rotation of the driven wheels. Furthermore, by the geometric centre is meant the centre of the circumference of the feed displacing means. Said centre is, because of its rotatability, in principle a circle. The feed displacing means may also be suspended obliquely to some extent, so that the vertical projection becomes an ellipse. Nevertheless, the centre then remains clearly defined, but the radius is not completely equal to the radius of the circumference, viewed in the direction of operative travel. In principle it is also possible to take, as feed displacing means, a continuous flexible conveyor belt, which can in fact be given any shape. In all such cases, in connection with the distance ratio, by radius is meant the average angle radius of the projection of said circumference. Incidentally, in practice, also in the case of the somewhat tilting ring, the difference between the latter radius and the actual radius of the ring is fractional.

It is further pointed out that the wheel axles of the rear wheels need in principle not be in line with each other. However, advantageously they are indeed in line, which provides a simpler control, and especially a more stable control in bi-directional curves. Finally, by circumference is meant the outer circumference at floor level, consequently at the operative level of the feed displacing means. For, there may be mounted protective brackets which should serve as outer parts, to perform their protective function. On the other hand, the same holds for the feed displacing means which, on the contrary, should come into contact with the feed. However, this takes place at floor level, whereas a satisfactory protective action can be obtained by means of a protective bracket/bumper at a somewhat higher level.

In particular, the above-mentioned distance amounts to at most approximately one tenth of the radius. By "approximately" is meant here that the distance divided by the radius amounts to at most 0.1 in round figures. In practice, this is found to be a favourable distance range as regards control, which control takes place obviously more quietly than in the case of positioning on corner points of a frame, consequently at a larger distance from the centre.

In embodiments, said wheels, viewed in the direction of operative travel, are situated behind the geometric centre. For, in principle, said wheels may be situated at the same distance in front of or behind the geometric centre, but in the latter case the horizontal stability is better. Nevertheless, an embodiment in which said rear wheels are situated in front of the geometric centre, but still behind the centre of gravity, remains a workable possibility. For the sake of clarity it is pointed out here that all terms "in front of" and "behind" in each case relate to the direction of operative travel. In most cases, the vehicle can also move rearwardly, but will then usually not displace feed, because it has already passed by shortly before.

In embodiments, the front supporting point comprises a sliding shoe, a ball, or a third wheel, advantageously a swivel wheel. Especially a swivel wheel provides low friction running and high resistance against contamination, which is advantageous in often dirty conditions.

Advantageously, the front supporting point, viewed perpendicularly to the direction of operative travel and in side view, is situated at a distance of at least half the radius from said perpendicular line, in other words, the front supporting point is situated at a distance of at least half the radius from the geometric centre. Since the front supporting point does (almost) not play a part in the control, it is advantageous to position said point far from the geometric centre, because this results in an enhanced horizontal stability.

For many other details of the vehicle reference is expressly made to NL-1031605, which is hereby incorporated by reference in its entirety. Some more specific points are elucidated below, but for the construction of the vehicle and of components to which is not expressly referred below, reference is made to the corresponding passages in the cited document.

The control of the vehicle can for example take place by means of a strip which indicates the path to be followed and which can be followed, by means of sensors measuring a fixed or non-fixed distance to an object, such as a feed fence, by means of a local or non-local GPS-like system, by means of a torque difference determining system, etcetera. Advantageously, the vehicle, at least the control unit thereof, is programmable or even remotely controllable, so that during operation for example a route or a set distance can be changed.

If the feed displacing means comprise a freely rotatable annular or circular element whose outer circumference constitutes the outer circumference of the vehicle, no separate drive for the feed displacing means is needed, since the freely rotatable element is driven by the feed itself (substantially by frictional engagement). If desired, the outer surface of the annular or circular element may be provided with one or more friction increasing layers and/or elements. For obtaining a reliable, substantially lateral displacement of the feed, an embodiment of an unmanned vehicle according to the invention is characterized in that the element is tilted in such a manner that, at least substantially in the direction of operative travel of the vehicle, it is located closest to the floor, preferably at the side in which the feed has to be displaced. If the angle enclosed by the element and the floor and/or the side in which the lowest point is situated are/is adjustable, the unmanned vehicle can be adjusted to displace different sorts of feed in a correct manner at least almost substantially transversely to the direction of travel of the vehicle.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
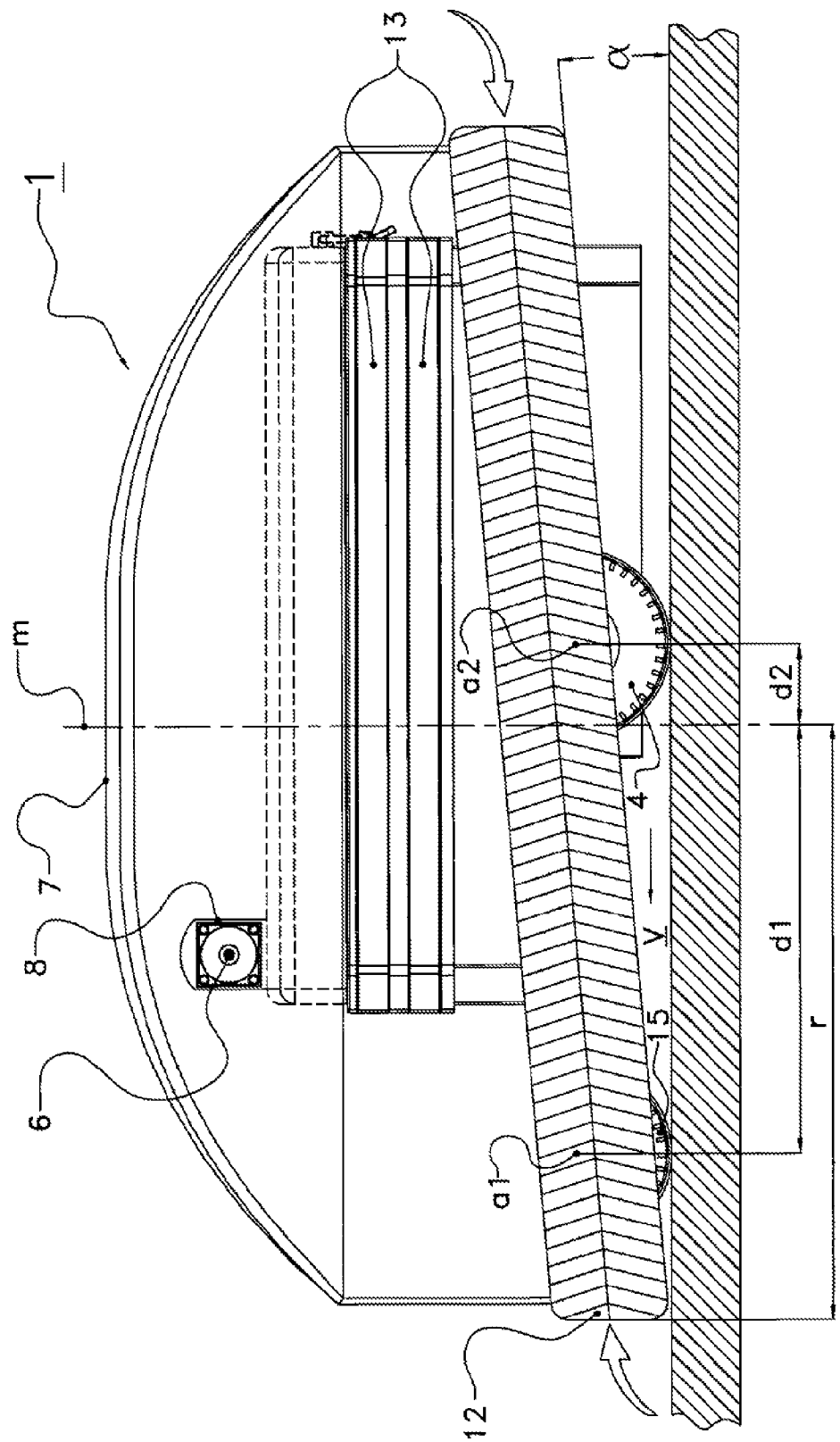
FIG. 1 is a diagrammatic side view of the unmanned vehicle according to the invention.
Figure 2:
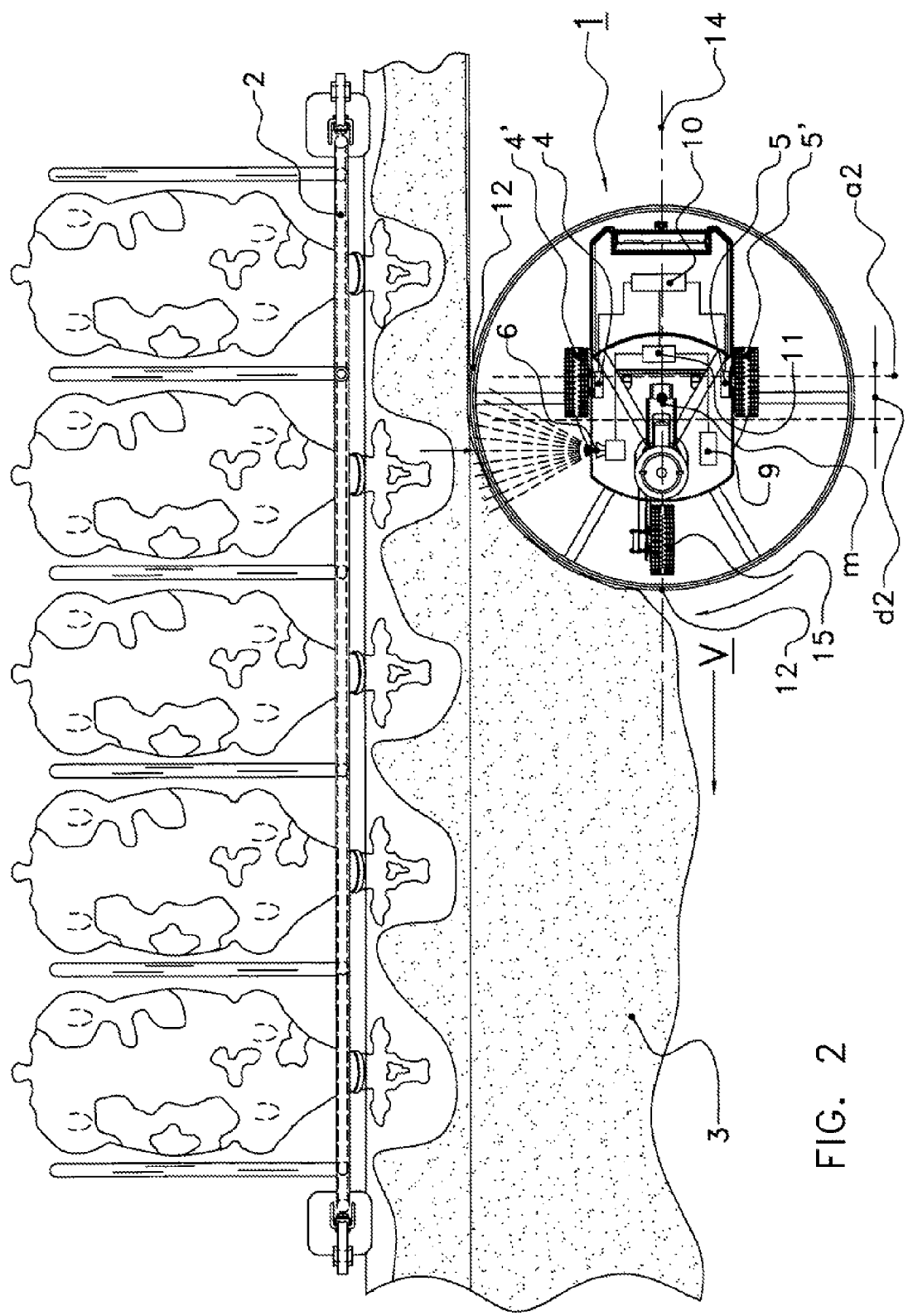
FIG. 2 is a diagrammatic top view of the unmanned vehicle according to the invention for use in the case of displacing feed to a feed fence.

The following is a description of certain embodiments of the invention, given by way of example only and with reference to the drawings. FIGS. 1 and 2 show an unmanned autonomous vehicle 1 for substantially lateral displacement of feed 3 lying on a floor to a feed fence 2. The feed 3, which can be solid, liquid or a mixture thereof, has been deposited at the feed fence 2 in a manner known per se, for example by means of a tractor. It will be obvious that the present invention can also be applied to other devices for supplying feed to animals, so that the feed fence shown in FIG. 2 is only one of the many examples of a wall portion in the vicinity of which feed can be deposited. In the present invention, by the term "wall portion" are meant all forms of separating elements, whether or not having an open structure, it being possible for the wall portion to assume many different, curved, rectilinear, angular, etc. shapes.

Autonomously displaceable vehicles for performing numerous different functions, as well as the control of such vehicles, are known per se and will therefore not be described here in further detail. Automatic charging of the energy supply of the vehicle and automatic loading and unloading of other materials into and from, respectively, containers present on the vehicle are known as well. It is sufficient to refer to the following patent documents: U.S. Pat. No. 2,966,256, DE-1109441, DE-1183301, EP-0382693, DE-4425924, U.S. Pat. No. 5,309,592, EP-0142594, DE-4444508, GB-2313190, U.S. Pat. No. 5,109,566, GB-2313191, U.S. Pat. No. 3,273,038, NL-7416427, U.S. Pat. No. 5,341,540, U.S. Pat. No. 5,646,494, EP-0943235, EP-1369010, EP-1369012 en EP-1368017, but in particular the above-mentioned NL-1031605. All the aforementioned patent documents are hereby incorporated by reference in their entirety.

The unmanned vehicle 1 comprises two wheels 4', 5', each having a wheel axle a2, which are drivable by separate drive means 4, 5. The drive means are preferably constituted by separately controllable electric motors. Additionally, there is a front supporting point in the form of a wheel 15, preferably a swivel wheel, having a wheel axle a1. The geometric centre of the vehicle 1 is denoted by the dash line m (see FIG. 1), and the intended direction of operative travel is denoted by the arrow v. Line m in FIG. 1 is a perpendicular line, in particular a vertical perpendicular line through the above-mentioned geometric centre or centre point. It is visible (see FIG. 1) that the wheel axle a2 is situated at a (shortest) distance d2 behind the geometric centre (or in the view of FIG. 1 behind the perpendicular line m), and that the front wheel axle a1 is situated at a distance d1 in front of the geometric centre (or in the view of FIG. 1 in front of the perpendicular line m).

The unmanned vehicle 1 is further provided with a distance determining means 6, in the embodiment shown an ultrasonic sensor, for determining the distance from the vehicle 1 to the feed fence 2. It will be obvious that all suitable sensors known in the technique, such as for example the sensors mentioned in the patent documents enumerated above, can be used for the purpose of distance determination. The unmanned vehicle 1 may be provided with an external, protective covering 7, which is provided with apertures 8, so that the ultrasonic sensor 6 is enabled to detect the feed fence 2. In order to prevent material, such as feed and the like, from accumulating, via the apertures 8, in the interior of the unmanned vehicle 1, the bottom of the unmanned vehicle 1 is at least partially open.

The unmanned vehicle 1 further comprises an orientation determining means 9, in the embodiment shown a gyroscope, for determining the orientation of the centre line 14 of the vehicle 1 relative to the feed fence 2. It will be obvious that all suitable sensors known in the technique, such as for example the sensors mentioned in the patent documents enumerated above, can be used for the purpose of orientation determination, such as an electronic compass or a camera with image recognition equipment.

The unmanned vehicle 1 is also provided with a torque difference determining means 10 for determining a possible torque difference between the wheels 4', 5'. Such a torque difference determining means, which uses data from the drive means 4, 5, is known per se. Such a torque difference determining means can also be used for detecting skid of one (or both) of the wheels, after which detection it is possible to perform a corrective action (reducing the number of revolutions, alerting an operator).

The unmanned vehicle 1 is further provided with a control unit 11 for controlling the unmanned vehicle 1 and moving it in a direction of (operative) travel, which control unit 11 is connected, via electric wires or, if desired, in a wireless manner, to the distance determining means 6, the orientation determining means 9, the torque difference determining means 10, and the drive mechanisms 4, 5 of the wheels 4', 5' for exchanging data.

For displacing feed 3 substantially transversely to the direction of operative travel V of the unmanned vehicle, the unmanned vehicle 1 is provided with feed displacing means 12. Such feed displacing means may be constituted by an obliquely disposed slide, or by a conveyor belt. However, according to a preferred embodiment of the invention, these feed displacing means 12 are preferably constituted by a freely rotatable circular element 12, whose outer circumference constitutes the outer circumference of the unmanned vehicle 1. When, during operation of the unmanned vehicle 1, the circular element 12, which may, for example, be a ring or a disc, comes into contact with the feed, this element 12 is automatically rotated, in other words, the circular element 12 is feed-driven. A highly reproducible displacement of the feed is obtained if the circular element 12 is tilted in such a manner at an angle $\alpha$ (see FIG. 1) that it is located closest to the floor, at least substantially in the direction of operative travel V of the vehicle 1. In dependence on the feed to be displaced, the angle $\alpha$, enclosed by the circular element 12 and the floor, can be adjustable. The angle $\alpha$ can possibly be adjusted during operation of the vehicle 1 with the aid of tilting means known per se (not shown), such as a cylinder, controlled by the control unit 11.

The feed displacing means 12 have a radius r as shown in FIG. 2. Because of their rotatability, the feed displacing means 12 constitute, in a top view, in principle a circle. The feed displacing means 12 may also be suspended obliquely to some extent, as shown in FIG. 1, so that the vertical projection becomes an ellipse. Nevertheless, the centre then remains clearly defined. The distances d1 and d2 are then as shown in FIG. 1. According to the invention, the ratio of the distances d2 and r is smaller than one third, in FIG. 1 approximately 0.13. This results in a more stable control, even under the influence of the variable and obliquely acting forces. These forces occur when feed 3 is pushed aside, which, of course, does not take place completely regularly, and always obliquely on the front. This results in a variable transverse force and also in a variable moment, so that a highly variable torque acts on the vehicle 1. This would cause the vehicle 1 to turn away from the route, but this is compensated by accordingly adjusting the driving force on the wheels 4' and (in particular) 5', by the control unit 11.

It should be noted that, in principle, the centre of gravity of the vehicle should be situated in front of the wheel axle a2, in order to achieve a good horizontal stability. The weight distribution required for this purpose is assumed in the example. Often, the larger part of the weight is distributed approximately symmetrically, and positioning of the wheel axles a2 behind the centre m suffices. However, if the larger part of the weight is displaced more to the front, positioning of the wheels 4', 5' in the centre m, or even somewhat in front thereof, may still suffice. Moreover, in this example, the distance d1 from the front wheel to the centre m is more than 0.7× the radius, which contributes per se to the (horizontal) stability of the vehicle 1.

When depositing the feed on the floor, and during eating of the feed by animals present at the feed fence, the feed is accumulated to different heights over different distances to the feed fence. In order that the animals will always be able to get at a desired amount of feed in a simple manner, it is ensured that feed is displaced to the feed fence by having the unmanned vehicle regularly move along the feed fence 2, as diagrammatically shown in FIG. 2. In order that the unmanned vehicle 1 is correctly controlled, the control unit 11 is programmed in such a way that during operation the vehicle 1 will maintain a distance determined by the distance determining means 6 to the feed fence 2, which distance is greater than or equal to a pre-set minimum distance to the feed fence, and that during operation the centre line 14 of the vehicle will maintain an orientation determined by the orientation determining means 9 relative to the feed fence 2, which orientation is at least almost equal to a pre-set orientation, and that during operation the drivable wheels 4, 5 of the unmanned vehicle 1 will show a torque difference determined by the torque difference determining means 10, which torque difference is smaller than or equal to a pre-set maximum torque. This means that the unmanned vehicle 1 will always maintain a correct orientation relative to the feed fence 2, that the unmanned vehicle 1 will not come within the minimum distance to the feed fence 2, and that it is ensured that the feed will not be accumulated too much, because, in the case of the unmanned vehicle 1 moving through a too large amount of feed, the torque difference would become too great.

The control unit 11 is programmed in such a way that, for the control of the unmanned vehicle 1, priority is given to the distance determined by the distance determining means 6 in combination with the pre-set minimum distance.

In a preferred embodiment of an unmanned vehicle 1, the pre-adjustable distance is adjustable during operation. The adjustment may, for example, depend on the moment of the day, the period which has elapsed since the unmanned vehicle was present at the same position, the sort of animals or the individual animals which are present at the feed fence. In a preferred embodiment of an unmanned vehicle, the pre-set maximum torque difference and/or the pre-set orientation are/is also adjustable during operation.

The unmanned autonomous vehicle 1 is provided with a (non-shown) energy supply which is chargeable via laterally disposed charging strips 13 that are capable of being brought into contact with a charging device. Other ways of charging the energy supply, such as inductive means, are mentioned inter alia in the above-mentioned patent documents.

Although not shown in the figures, the unmanned vehicle 1 may additionally be configured to dispense feed. For this purpose, the unmanned vehicle 1 may be provided with a storage container for containing feed, and a discharge device for discharging feed towards the floor. The storage container is preferably provided with a mixing means for mixing feed. Here, it is advantageous if the control unit controls the operation of the discharge device using data from the distance determining means and/or the torque difference determining means and/or the speed of the vehicle and/or the weight decrease of the storage container. This makes it possible, inter alia, to dispense a uniform amount of feed. When, for example, at a certain distance to the feed fence the torque difference comes below a particular value (for example in a search table stored in a memory of the control unit), the amount of feed has decreased below a particular value. On the basis of these data, it is possible for the discharge device to deposit a certain amount of feed on that place of the floor. Alternatively or additionally, the unmanned vehicle 1 may be provided with a signalling means (for example a transmitting aerial with a suitable controlling transmitter circuit) for supplying a signal (for example for drawing the attention of an owner and/or operator of the unmanned vehicle), the control unit controlling the operation of the signalling means using data from the distance determining means and/or the torque difference determining means. The invention is based on the insight that the magnitude of the torque difference depends on the amount of feed present on the floor through which the unmanned vehicle moves, and this torque difference can thus advantageously be used together with the determined distance and orientation for a correct control of the unmanned vehicle.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An unmanned autonomous vehicle for displacing feed lying on a floor substantially laterally with respect to a direction of operative travel, the unmanned autonomous vehicle comprising:
    a frame having at least three supporting points, comprising a front supporting point and two wheels separately drivable by separate motors and each having a wheel axle,
    a control unit for steering and moving the vehicle, and
    feed displacer for displacing feed substantially laterally, comprising an annular element which is freely rotatable around the frame and has a radius, the outer circumference of said element constituting the outer circumference of the vehicle,
    wherein a centre of gravity of the vehicle, viewed in the direction of operative travel, is situated between the front supporting point and the wheels,
    wherein, viewed perpendicularly to the direction of operative travel and in side view, a distance between each of the wheel axles and a perpendicular line through a geometric centre of the feed displacer amounts to less than one third of said radius.

2. The vehicle according to claim 1, wherein said distance amounts to at most approximately one tenth of the radius.

3. The vehicle according to claim 1, wherein said wheels, viewed in the direction of operative travel, are situated behind the geometric centre.

4. The vehicle according to claim 1, wherein the front supporting point comprises a sliding shoe, a ball, or a third wheel.

5. The vehicle according to claim 4, wherein the front supporting point comprises a swivel wheel.

6. The vehicle according to claim 4, wherein the front supporting point, viewed perpendicularly to the direction of operative travel and in side view, is situated at a distance of at least half the radius from said perpendicular line.

7. The vehicle according to claim 1, wherein the control unit is connected for exchanging data to at least one of: a distance determining mechanism, an orientation determining mechanism, a torque difference determining mechanism and a drive mechanism of the wheels.

8. The vehicle according to claim 1, wherein, during operation, the vehicle will maintain a distance determined by the distance determining mechanism to a feed fence, which distance is greater than or equal to a pre-set minimum distance to the feed fence.

9. The vehicle according to claim 8, wherein the pre-set distance is adjustable during operation.

10. The vehicle according to claim 8, wherein the distance determining mechanism is an ultrasonic sensor.

11. The vehicle according to claim 7, wherein during operation the centre line of the vehicle will maintain an orientation determined by the orientation determining mechanism relative to the feed fence, which orientation is at least almost equal to a pre-set orientation.

12. The vehicle according to claim 11, wherein the pre-set orientation is adjustable during operation.

13. The vehicle according to claim 7, wherein, during operation the wheels of the vehicle will show a torque difference determined by the torque difference determining mechanism, which torque difference is smaller than or equal to a pre-set maximum torque.

14. The vehicle according to claim 13, wherein the pre-set maximum torque is adjustable during operation.

15. The vehicle according to claim 7, wherein the unmanned vehicle is further provided with an external protective covering that is provided with at least one of the distance determining mechanism, the orientation determining mechanism, the torque difference determining mechanism.

16. The vehicle according to claim 1, wherein the bottom of the unmanned vehicle is at least partially open.

17. The vehicle according to claim 1 wherein the feed displacer comprises an obliquely disposed slide or a conveyor belt.

18. The vehicle according to claim 1, wherein the feed displacer comprises a ring or a disc.

19. The vehicle according to claim 1, wherein the circular element is tilted at an angle $\alpha$ that it is located closest to the floor, at least substantially in the direction of operative travel of the vehicle.

20. The vehicle according to claim 1, wherein the feed displacer, when viewed in a top view, forms a circle or an ellipse.

* * * * *